United States Patent Office 2,995,853
Patented Aug. 15, 1961

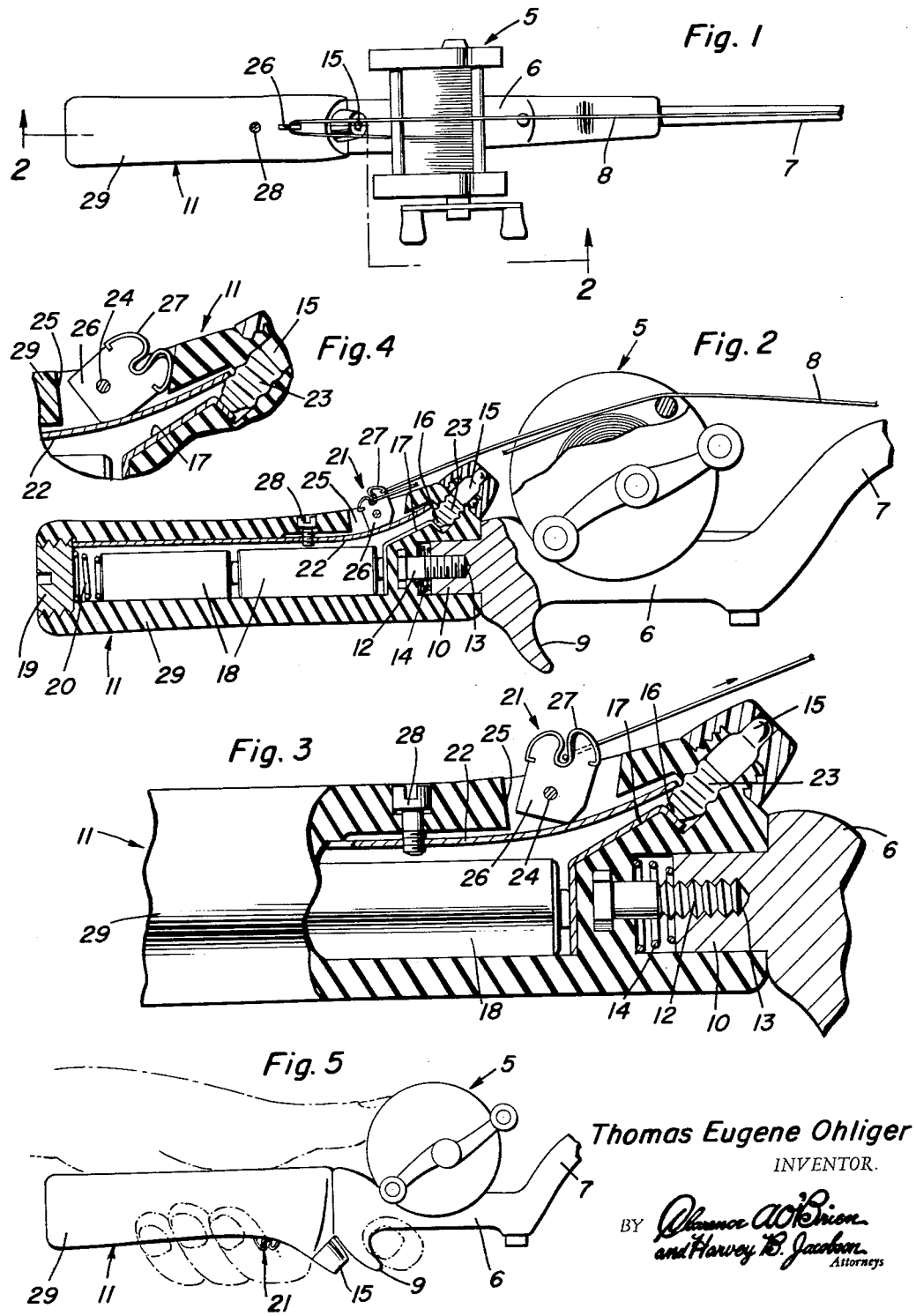
Aug. 15, 1961     T. E. OHLIGER     2,995,853
FISHING ROD
Filed April 25, 1958
Thomas Eugene Ohliger
INVENTOR.

2,955,853
FISHING ROD
Thomas Eugene Ohliger, Louisville, Ohio
(1604 Miami Court NE., Canton, Ohio)
Filed Apr. 25, 1958, Ser. No. 731,041
4 Claims. (Cl. 43—17)

The present invention relates to new and useful improvements in fishing rods and has one of its important objects to provide, in a manner as hereinafter set forth, a device of this character comprising a removable handle having incorporated therein a switch controlled electric light, said handle being rotatably adjustable to facilitate baiting the line, to provide a follow light for the fish catch and for netting as well as for providing a light on the reel and the ground, etc.

Another very important object of the invention is to provide a fishing rod of the aforementioned character comprising means for visually signalling when a bite on the line is had.

Other objects of the invention are to provide a fishing rod of the character described which will be comparatively simple in construction, strong, durable, compact, of light weight and which may be manufactured at low cost.

These together with other objects and advantages which will become subsequently apparent reside in the details of construction and operation as more fully hereinafter described and claimed, reference being had to the accompanying drawing forming a part hereof, wherein like numerals refer to like parts throughout, and in which—

FIGURE 1 is a top plan view of a fishing rod embodying the present invention;

FIGURE 2 is an enlarged view principally in vertical longitudinal section through the device, taken substantially on the line 2—2 of FIGURE 1, showing the switch in open position;

FIGURE 3 is an enlarged fragmentary view in vertical longitudinal section showing the switch closed for giving a flashing signal as when a bite or nibble is had;

FIGURE 4 is a fragmentary sectional view, showing the switch in fully closed position for giving a continuous or steady signal, as when the fish hits the line hard or takes it and runs; and FIGURE 5 is a view in side elevation, showing the light in position to illuminate the ground, for baiting the line, following the plug or catch, netting, etc.

Referring now to the drawing in detail, it will be seen that reference character 5 designates a conventional fishing reel mounted in the usual manner on the seat 6 of a rod 7. Reference character 8 designates a fishing line having one end connected to the reel 5 for winding thereon. Depending from the rear end portion of the seat 6 is the usual finger catch 9.

Formed integrally with the rear or butt end of the seat 6 is a longitudinally projecting cylindrical shank 10. A tubular handle 11 comprising a tubular body 29 is removably and rotatably mounted on the shank 10. The forward end portion of the handle 11 is journaled on the shank 10 and has fixed longitudinally therein a screw 12 which is threaded into a socket 13 provided therefor in said shank. A coil spring 14 is mounted under compression between the shank 10 and the handle 11 for frictionally resisting rotation of said handle on said shank, said spring encircling the screw 12.

Removably mounted in the forward end portion of the handle 11 is a forwardly inclined electric lamp 15. The base 16 of the lamp 15 is engaged with one end portion of a conductor 17 in the handle 11. The other end portion of the conductor 17 is electrically connected with a pair of batteries 18 in the handle 11. A removable plug 19 in the rear end portion of the handle 11 permits insertion and removal of the batteries 18. A coil spring 20 yieldingly urges the batteries 18 forwardly in the handle 11 in the usual manner.

A switch 21 controls the electric circuit to the lamp 15. The switch 21 includes a resilient conductor strip or contact 22 which is mounted longitudinally in the tubular handle 11 and is electrically connected at its rear end to the batteries 18 through the coil spring 20, etc. The forward end portion of the contact 22 is free to swing in the handle 11 and is engageable with the shell 23 of the lamp 15. Journaled at 24 in a slot 25 provided therefor in the forward portion of the handle 11 is a cam or toggle 26 for engaging the contact 22 with the lamp shell 23. The toggle 26 is shaped to accommodate and has mounted thereon a generally U-shaped resilient metallic clip or guide 27 which opens at the free end of said toggle and in which the line 8 is slidably engaged. A screw 28 is rotatably mounted in the handle 11 and threaded through the contact 22 at a point rearwardly of but adjacent to the toggle 26 for regulating the tension of said contact.

It is though that the use or operation of the invention will be readily apparent from a consideration of the foregoing. Briefly, with the toggle 26 in its rearmost position, as shown in FIGURE 2 of the drawing, the contact 22 is out of engagement with the shell 23 of the lamp 15 and the circuit to the lamp is open. When the light is to be used as a signal, the line 8 is looped through the clip 27, and the reel 5 is turned for winding said line thereon for removing excess slack. When a fish nibbles on the bait the toggle 26 is swung forwardly substantially to the intermediate position of FIGURE 3 of the drawing and jiggled for vibrating the resilient contact 22 for giving a flashing signal. Should the nibbling cease, the contact 22 returns the toggle 26 to the position of FIGURE 2. If the fish hits the line hard or takes it and runs, the toggle 26 is swung all the way forward to the position of FIGURE 4 of the drawing where it remains, until manually retracted, for giving a continuous or steady signal. When this occurs the line 8 slips out of the clip or guide 27 and the fisherman is ready to reel in. Of course, the toggle 26 may be manually actuated for energizing the lamp 15. With the lamp 15 in the position of FIGURES 2 and 3 of the drawing the reel 5 will be illuminated. To illuminate the ground, for instance, or to facilitate baiting a hook, following the plug or catch, netting, etc., the handle 11 is rotatably adjusted to the position of FIGURE 5 of the drawing. The coil spring 14 frictionally secures the handle 11 in adjusted position. When a free flashlight is desired the handle 11 is rotated to turn the screw 12 out of the socket 13 for permitting said handle to be slipped off the shank 10.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A fishing rod handle comprising: a tubular body, an electric lamp on the body, batteries in the body, a circuit in the body electrically connecting the batteries to the lamp, said circuit including a normally open control switch comprising a toggle and a contact operable thereby, and a generally U-shaped resilient clip on the toggle open at the free end thereof, said clip having its open end open upwardly when the switch is in open position and having its open end open forwardly and away from said handle when the switch is in closed position whereby said toggle and clip provide means for slidably and releasably connecting a fishing line thereto for actuating said toggle for closing the switch.

2. A fishing rod handle comprising a tubular body, an electric lamp mounted on said body, batteries mounted in the body, and a circuit electrically connecting said batteries to the lamp, said circuit comprising a normally open switch including a resilient conductor strip electrically connected at one end to the batteries and having its other end free and electrically engageable with the lamp for closing the circuit, a cam journaled on the body and swingable past dead center for engaging and retaining the conductor strip under tension with the lamp, means for slidably and releasably connecting a fishing line to the cam for actuating same, and means for regulating the tension of the conductor strip, the last named means including a screw rotatably mounted in the body and threadedly connected to said conductor strip.

3. A fishing rod handle comprising a tubular body, an electric lamp mounted on said body, batteries mounted in the body, and a circuit electrically connecting said batteries to the lamp, said circuit comprising a normally open switch including a resilient conductor strip electrically connected at one end to the batteries and having its other end free and electrically engageable with the lamp for closing the circuit, a cam journaled on the body and swingable past dead center for engaging and retaining the conductor strip under tension with the lamp, means for slidably and releasably connecting a fishing line to the cam for actuating same, and means for regulating the tension of the conductor strip, the last named means including a screw rotatably mounted in the body and threadedly connected to said conductor strip, the first named means comprising a generally U-shaped, resilient clip mounted on the cam for the reception of a loop in the line.

4. A fishing device comprising a rod, a longitudinal shank on one end of the rod, an elongated handle having a socket in its forward end portion slidably and rotatably receiving the shank, a generally forwardly and outwardly directed electric lamp on said forward end portion of the handle, said handle being freely rotatably adjustable on the shank for projecting light from the lamp in any direction in an arc of 360° around the rod, a screw fixed in the socket and threaded into the shank for rotatably anchoring the handle thereon, and a compressed coil spring encircling the screw between the shank and the handle for frictionally securing the handle in adjusted position.

References Cited in the file of this patent

UNITED STATES PATENTS

| | | |
|---|---|---|
| 1,001,195 | Gillette | Aug. 22, 1911 |
| 1,707,901 | Bubb | Apr. 2, 1929 |
| 1,909,641 | Watts | May 16, 1933 |
| 2,152,385 | Mayer | Mar. 28, 1939 |
| 2,506,370 | Leyda | May 2, 1950 |
| 2,538,788 | Massino | Jan. 23, 1951 |
| 2,565,633 | Scott | Aug. 23, 1951 |
| 2,590,721 | Muth | Mar. 25, 1952 |
| 2,762,907 | Schwartz | Sept. 11, 1956 |
| 2,791,676 | Cote | May 7, 1957 |